United States Patent Office 3,029,475
Patented Apr. 17, 1962

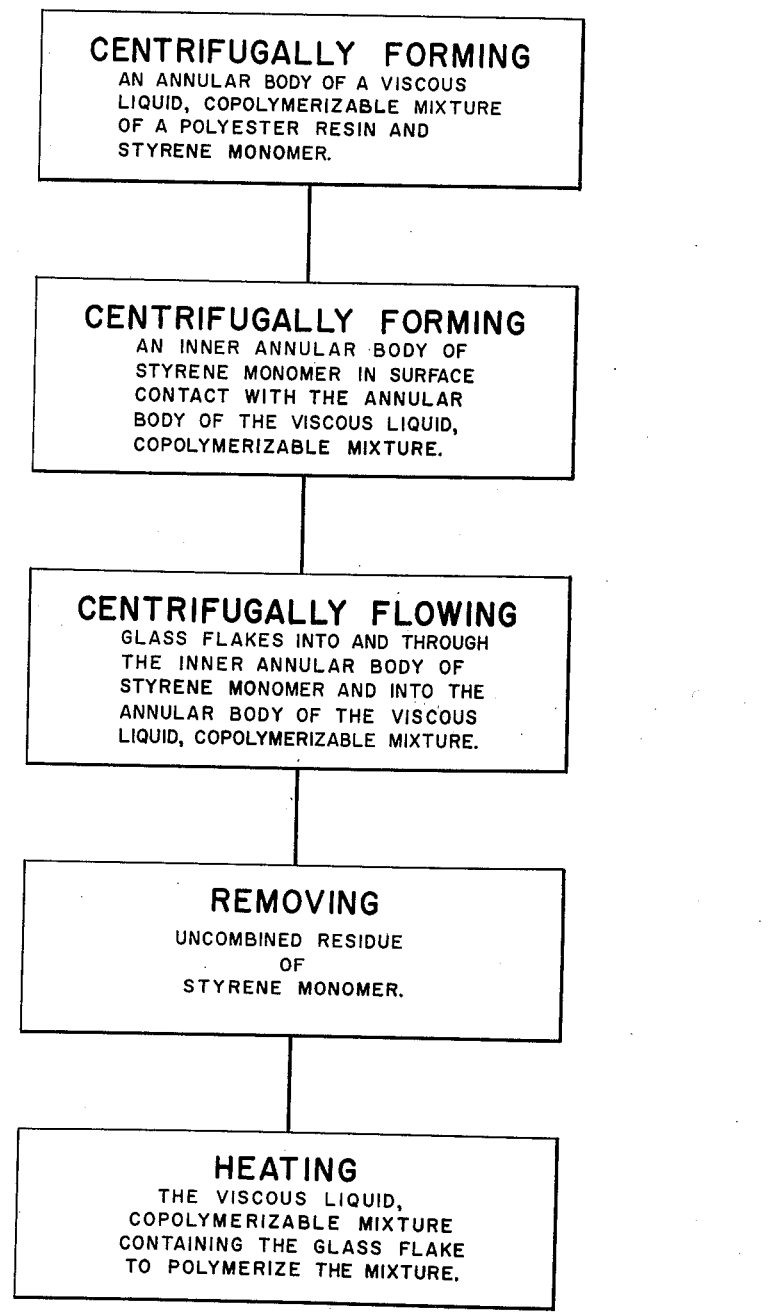

3,029,475
METHOD FOR ADMIXING REINFORCING MATERIALS AND VISCOUS LIQUID MATERIALS
Andrew L. Bastone, Hope, R.I., assignor to Owens-Corning Fiberglas Corporation, a corporation of Delaware
Filed Dec. 29, 1958, Ser. No. 783,197
14 Claims. (Cl. 18—58.3)

This invention relates to a method for admixing reinforcing materials and viscous liquid materials, and more particularly to a method for admixing particulate reinforcing materials such as fibers and flakes and viscous liquid resins, including the prevention of the introduction of adsorbed air into the reinforced resinous mixture.

One of the serious problems involved in the preparation of reinforced resins which are very viscous in their liquid stages is the difficulty of removing trapped air from the liquid masses. This is accentuated when reinforcing media, such as particulate fibers and, more particularly, flakes, are added to the viscous liquid resin before it is cured. Adsorbed air on the surfaces of fibers, such as glass fibers, is difficult to remove from the liquid resin because the viscosity of the resin is so high that the air does not flow to its surface and even the use of centrifuging techniques is not satisfactory from a standpoint of the time and effort required to remove the trapped air. This is an even more difficult problem where the reinforcing medium is in the form of thin flakes, such as glass flakes, because of the large areas of the flakes and their close packing.

Fiber and flake reinforced resins have great utility in many applications where the relatively high tensile strengths of the fibers or flakes can be employed for greatly strengthening the finally cured resinous mass. In other cases the coefficient of expansion of the fibers or flakes, for example glass, gives the finished product properties it does not otherwise have. As other examples, resins reinforced by glass flakes have high dielectric strengths and the pressure of the reinforcing flakes may give the resin a new property, such as the ability to polarize light.

The instant invention comprises a method in which a body of a first viscous liquid, which is the basic resin, for examples, a viscous liquid polyester resin or a solution of a polyester and styrene which are to be copolymerized, or a methyl methacrylate polymer solution in an unpolymerized acrylic monomer, is centrifugally formed into an annular body and in which a second liquid is centrifugally formed into an inner annular body in surface contact with the first body. The reinforcing medium is then centrifugally flowed through the second liquid and from the second liquid into the first viscous liquid, be it a single resin, a combination of resins or a solution thereof, where the reinforcing medium is finally to be employed. The second liquid, as spoken of herein, may be a liquid which is soluble in the first viscous liquid material, or in which the first viscous liquid material is soluble. It should be a liquid which will wet the reinforcing medium. It must be a liquid which is less dense than the liquid to be reinforced, so that the second liquid will remain at the inner side of the annular body of the viscous liquid material being reinforced. The second liquid may, for example, be copolymerizable with the first liquid or it may have other attributes with respect to the first viscous resin being reinforced as, for example, to protect the first viscous material from an adverse reaction with air. It is essential that the two liquids be compatible with each other at least in surface contact. It is also essential that the second liquid forming the inner annular body be one which is compatible with the reinforcing medium whether it is fibers or flakes.

The second liquid in the inner annular body may function primarily for the purpose of wetting the reinforcing medium and thus "wiping off" adsorbed air so that the reinforcing medium does not carry adsorbed air into the first liquid in passing thereinto from the second liquid. While it is probably preferable that the second liquid be of lower viscosity than the viscous material being reinforced, this is not essential to the process of the invention, because its viscosity determines whether or not the air wiped off the reinforcing medium escapes from the second liquid which is relatively immaterial. If the second liquid is less viscous than the first, entrapped air can flow to its surface more readily. If the second liquid is quite viscous, the air could remain in this liquid, and even might froth the second liquid. This is not material because the second liquid is removed from contact with, prior to the ultimate utilization of, the reinforced viscous material.

The principal object of this invention, therefore, is to provide a method whereby reinforcing media may be readily admixed with viscous liquid materials while the concomitant introduction of adsorbed air into the admixture is prevented.

It is a further object of this invention to provide a method wherein reinforcing media may be admixed with viscous liquid materials, such as resins, without the introduction of adsorbed air into the resins and wherein the media may also carry into the resins controlled quantities of other liquids for copolymerization therewith or for other purposes.

These and other objects and advantages of the invention will be better understood from the following specification, wherein, as in the appended claims, the terms "percent" and "parts" are used to refer to percent and parts by weight unless otherwise indicated.

The drawing is a flowsheet in block form of the process comprising the steps of: centrifugally forming an annular body of a viscous liquid, copolymerizable mixture of a polyester resin and styrene monomer; centrifugally forming an inner annular body of styrene monomer in surface contact with the annular body of the viscous liquid, copolymerizable mixture; centrifugally flowing glass flakes into and through the inner annular body of styrene monomer and into the annular body of the viscous liquid copolymerizable mixture; removing uncombined residue of styrene monomer; and heating the viscous liquid, copolymerizable mixture containing the glass flake to polymerize the mixture.

The compatibility of glass fibers and glass flakes with polyester resins for the production of glass reinforced polyester bodies is well known. Polyester resins in liquid form are heavy viscous liquids and, therefore, the problem of mixing the reinforcing glass fibers or flakes thereinto is one of extreme difficulty. According to a specific embodiment of the invention, a selected quantity of a polyester resin is centrifugally formed into an annular body, as by being poured into the open top of a circular centrifuge basket and rotating the centrifuge basket at a selected speed to flow the liquid viscous polyester to the circumferential wall of the centrifuge basket. The polyester thus handled may already contain a suitable catalyst or it may be a solution or mixture of a polyester with a copolymerizable material such as a monomer, for example, styrene. A selected quantity of styrene, for example, as a second liquid, is then poured into the open top of the centrifuge basket and centrifugally flowed outwardly and into an inner annular body in surface contact with the resin comprising the polyester, the quantity of the second liquid being selected according to principles set forth below.

If, for example, the final resin is to be a copolymer of a polyester and styrene, and the purpose of the admixture is merely to provide a reinforced molding compound, then the quantity of styrene included with the polyester solution poured into the centrifuge basket as the first viscous liquid will depend upon the particular ultimate composition desired. The quantity of styrene in the initial solution should be less than that desired for the final copolymerization because the passage of the reinforcing fibers or flakes through the inner body of styrene not only wipes off adsorbed air, but, since styrene wets glass, it also entrains a thin layer of styrene on each of the particulate reinforcing media. The entrained styrene is added to the polyester-styrene solution. By control of the quantities of styrene present in the polyester-styrene solution, the centrifugal force and, of course, the quantity of reinforcing medium to be handled, the precise desired proportion of styrene in the finished copolymerizable admixture is achieved.

The quantity of reinforcing medium added to any particular resinous body is determined, of course, by the ratio of resin to reinforcing medium desired in the final product according to well known rules. The selected quantity of reinforcing medium, for examples, glass fibers or glass flakes, is introduced into the open center of the centrifuge and centrifugally flowed into and through the inner body of the second liquid. By continued application of centrifugal force, the reinforcing medium is flowed into the polyester resin or polyester-styrene solution to be reinforced. After the reinforcing medium has been centrifugally flowed into the mass of resin to be reinforced, the uncombined residue of the inner annular body of the second liquid, for example, styrene monomer, is scooped out or otherwise removed from the centrifuge. In this sense, the words "uncombined residue" may cover either (1) all of the second liquid or (2) that part of the second liquid which has not been combined with, put into solution with, or carried into the mass of resin being reinforced.

*Example 1*

In order to admix reinforcing glass flakes in a polyester resin to be employed for the formation of reinforced polyester masses, a quantity of a polyester resin is mixed with a quantity of styrene monomer and a suitable catalyst in the following proportions:

|  | Grams |
|---|---|
| Polyester resin [1] | 300 |
| Styrene monomer | 30 |
| Benzoyl peroxide | 8 |

[1] The polyester resin is prepared by heating a charge consisting of 1.05 mols of ethylene glycol, 0.8 mol of maleic anhydride, 0.2 mol phthalic anhydride and an amount of hydroquinone equal to 0.4 percent of the charge to a temperature of 230° C. in two hours, and holding the charge at a temperature between 230° C. and 235° C. for five additional hours. An 80 part portion of the resulting reaction product, which is an unsaturated, polymerizable polyester, is mixed with 20 parts of methylmethacrylate monomer, and a 75 part portion of the resulting mixture is blended with 50 parts of styrene monomer, 0.3 part of vinyldimethoxyethoxysilane, and 1.8 parts of benzoyl peroxide, using a suitably driven propeller for agitation until a uniform composition is achieved.

This 338 gram mixture is flowed into the interior of a circular, open-topped centrifuge basket and the centrifuge driving motor actuated to rotate the centrifuge with sufficient force to flow the body of the mixture into an annular shape adjacent the outer wall of the centrifuge basket. A 200 gram portion of styrene monomer is then poured into the interior of the centrifuge basket while it is still rotating and flowed by centrifugal force to form an inner annular body in surface contact with the first body. A 300 gram portion of glass flakes, averaging 5 microns in thickness and in the order of 1/16" to 1/8" in lateral dimensions, are poured into the open top of the centrifuge while continuing the rotation thereof. The centrifugal force flows the 300 grams of glass flakes through the inner styrene monomer body and form that body into the outer polyester-styrene liquid body. After continued centrifuging, so that all of the flakes are flowed outwardly from the inner styrene body, about 100 grams of the styrene monomer are removed by scooping them out of the centrifuge. The remainder comprises 438 grams of a copolymerizable polyester-styrene composition with 300 grams of flake distributed therein.

Since the styrene monomer in the inner annular body wets the glass flakes thoroughly, it wipes off adsorbed air and since the styrene monomer is highly liquid, the adsorbed air is free to flow to the inner surface of the styrene and to escape therefrom. Virtually no air is carried with the flakes through the styrene monomer and into the polyester-styrene solution. After removal of the uncombined residue of the inner styrene monomer body, the mass of polyester-styrene and glass flakes is removed from the centrifuge and subjected to subsequent treatment such as curing thereof in a desired shape, for example, under pressure in a suitable mold cavity.

*Example 2*

In order to fabricate a polyester-glass flake, light-polarizing panel, a mixture of 300 grams of the previously identified polyester with 30 grams of added styrene monomer, and 6 grams of benzoyl peroxide as a catalyst is made. This mixture, totalling 336 grams in weight, is poured into a centrifuge basket according to the procedure outlined in Example 1, followed by a quantity of 200 grams of styrene monomer subsequently poured into the centrifuge basket for forming the inner annular body of the second liquid. A 300 gram portion of glass flakes of the type described in Example 1 is then poured into the centrifuge and flowed by centrifugal force through the inner body of styrene monomer and into the outer annular body of polyester-styrene solution. After the glass flakes have been centrifugally flowed into the polyester resin, the uncombined residue of 100 grams of monomer is scooped or otherwise removed from the centrifuge. In this example, the styrene present in solution in the polyester is in excess, relative to the benzoyl peroxide available to cause polymerization or copolymerization thereof with the polyester.

The mass of polyester-styrene solution and glass flakes is then formed in a suitable manner into a panel and cured by the application of heat thereto for polymerizing the mixture. Because of the high boiling point of the styrene in the solution relative to the resin curing temperature and because of the excessive quantity of styrene present relative to the curing catalyst, some of the styrene is not copolymerized with the polyester but is vaporized near the end of the curing cycle, or during a post-cure heating step. The gas migrates through the polyester-styrene copolymer to the weakest points in the mixture which occur at the interfaces between the flakes and resinous matrix. The gas collects in thin pockets at these interfaces and upon curing of the mass is trapped at these interfaces.

Such a panel has been found to have the surprising property of polarization of light by reason of the great numbers of separate reflections of light rays passing therethrough caused by the refraction of the rays upon passing from glass to gas, gas to resin, resin to gas, gas to glass, etc., during passage of the light rays through the panel.

*Example 3*

A 100 gram charge of a finely divided methyl methacrylate polymer is dissolved in 300 grams of methyl methacrylate monomer containing 4 grams of benzoyl peroxide as a polymerization catalyst. This solution is poured into the centrifuge basket as above described and centrifugally flowed to form an outer annular body. A 200 gram portion of uncatalyzed methyl methacrylate monomer is then poured into the centrifuge basket and flowed by centrifugal force to form an inner annular body. A 400 gram portion of glass flakes as described above is then poured into the open top of the centrifuge basket and centrifugally flowed through the inner body of unpolymerized catalyst-free monomer and through that body into the outer annular solution of acrylic polymer and in the acrylic monomer. After centrifuging, the acrylic monomer inner body (100 grams), i.e., the uncombined residue thereof, is scooped out or otherwise removed from the centrifuge and the remaining admixture subsequently treated for the production of flake reinforced acrylic resin.

The method of the invention is particularly advantageous in the just described Example 3 because of the catalytic action of air on a catalyst-containing solution of an acrylic polymer in an acrylic monomer. The presence of the inner annular body of unpolymerized acrylic monomer which does not contain a catalyst protects the inner surface of the outer solution from the catalytic action of air and prevents the formation on its inner surface of the tough skin which would otherwise result if the surface of the catalyst-containing solution were exposed to the air. The presence of the inner body in this example thus enables the centrifugal flowing of the reinforcing medium into the body of the polymer monomer solution which would otherwise be prevented by the tough skin thereof, as well as wiping off adsorbed air from the reinforcing medium, in this case glass flakes.

*Example 4*

A 350 gram portion of glass flakes and an 85 gram portion of chopped glass fibers averaging about ¼" in length, are poured into the open top of a centrifuge basket and centrifugally flowed into and through an inner body of unpolymerized, catalyst-free monomer and into the outer annular solution of acrylic polymer in the acrylic monomer, both prepared and formed in the centrifuge as in Example 3. After centrifuging, the acrylic monomer inner body (100 grams) is scooped out or otherwise removed from the centrifuge and the remaining admixture is subsequently treated for the production of flake and fiber reinforced acrylic resin.

*Example 5*

The procedure of Example 4 is repeated except that a charge of chopped glass fibers weighing 250 grams is used as a reinforcing medium in lieu of the combination of flakes and fibers.

It will be appreciated from the foregoing discussion and specific examples that the method of the instant invention is particularly important when it is desired to produce a reinforced article, for example an article reinforced with glass fiber or glass flakes. Ordinarily, such an article is produced from a polymerizable resinous material, most often a polymerizable synthetic resinous material. In practicing the invention, the principal function of the centrifuging step is to eliminate air adsorbed on the surfaces of the reinforcing material before the reinforcing material is incorporated in the resinous material, and thereby to avoid air pockets in the ultimate article that is produced, and without the necessity for a de-gassing operation. Preventing the entrapment of air or other gases is particularly important when the material being reinforced is one which is converted to a cured or hardened condition without the formation of any by-product. For example, ethylenically unsaturated polyesters of the type identified above and methylmethacrylate and other acrylic monomers polymerize or copolymerize without the formation of any by-product, or by addition polymerization. Urea formaldehyde-, melamine formaldehyde-, and phenol formaldehyde-resins, however, are converted to a hardened, cured condition by condensation, and water is a by-product of the condensation in every instance. In producing a reinforced hardened article from such a resin, i.e., one which cures by condensation, provision must be made to eliminate the water or other by-product of condensation during the curing cycle, and any entrapped air can reasonably be eliminated with the by-product of condensation. Glass flake reinforcement constitutes an excellent vapor barrier and essentially prevents elimination either of entrapped air or of by-products of condensation during a curing cycle. Accordingly, the method of the instant invention is particularly significant when the first material, or material to be reinforced, is converted to a cured, hardened condition by addition polymerization, e.g., when the first material is a composition comprising an ethylenically unsaturated polyester, in particular, a polyester produced from a glycol or glycol mixture and an ethylenically unsaturated dicarboxylic acid such as maleic acid, fumaric acid, itaconic acid, citraconic acid or the like, and, usually, also, with some limited amount of a dicarboxylic acid which is not ethylenically unsaturated, e.g., phthalic acid, when the first material is or includes a monomeric material having ethylenically unsaturated double bonds which are polymerizable, or when it is an epoxy.

It will be apparent that various changes and modifications can be made from the specific details discussed above and from the procedures recited in the examples without departing from the spirit and scope of the attached claims, and that, in its essential details, the invention provides a method for admixing reinforcing material and a viscous liquid material, which method comprises centrifuging a selected quantity of the viscous material to form an annular body thereof, forming an inner annular body in surface contact therewith from a second liquid material which is preferably less dense than the viscous material and which is compatible therewith at least in surface contact and with which the reinforcing material is at least compatible, flowing a selected quantity of the reinforcing material into and through the second material and into the viscous material by centrifugal force and removing the uncombined residue of the second material from adjacency to the viscous material.

I claim:

1. A method for admixing reinforcing material and a viscous liquid material which is convertible to a cured hardened condition by addition polymerization, which method comprises: centrifuging a selected quantity of the viscous material to form an annular body thereof; centrifugally forming an inner annular body in surface contact therewith from a second liquid material which is less dense than the viscous material and which is compatible therewith at least in surface contact and with which the reinforcing material is at least compatible; flowing a selected quantity of the reniforcing material into and through the second material and into the viscous material by centrifugal force; and removing the uncombined residue of the second material from adjacency to the viscous material.

2. A method according to claim 1 in which the second liquid material is appreciably soluble in the viscous material.

3. A method according to claim 1 in which the second liquid material is capable of wetting the reinforcing material.

4. A method according to claim 1 in which the reinforcing material is particulate and flake shaped.

5. A method for admixing reinforcing flakes and a viscous liquid resin which is convertible to a cured hardened condition by addition polymerization, which method comprises: centrifugally forming an annular body of the resin; centrifugally forming an inner annular body of a second liquid in surface contact with the body of resin, the second liquid being compatible with the resin and with the reinforcing flakes; centrifugally flowing a quantity of the reinforcing flakes into and through the second liquid and into the resin; removing the uncombined residue of the second liquid from adjacency to the resin; and curing the flake-containing resin to a solid state by addition polymerization.

6. A method according to claim 5 in which the second liquid is appreciably soluble in the resin.

7. A method according to claim 5 in which the second liquid is capable of wetting the flakes.

8. A method for preparing a flake reinforced polyester resin, comprising centrifugally forming an annular body of a viscous, liquid, polymerizable polyester resin, centrifugally forming an inner annular layer of a second liquid which is at least appreciably soluble therein and with which the flakes are compatible while maintaining centrifugal force on the annular body of the polyester resin, centrifugally flowing a quantity of the flakes into and through the inner layer of the second liquid and into the body of polyester resin, removing the uncombined residue of the second liquid, and polymerizing the polyester resin containing the flakes to a solid state.

9. A method according to claim 8 in which the second liquid is a monomer which is copolymerizable with the polyester resin.

10. A method according to claim 9 in which the second liquid is styrene monomer.

11. A method for preparing a glass flake-reinforced polyester resin comprising centrifugally forming an annular body of a viscous liquid, copolymerizable mixture of a polyester resin and styrene monomer, the styrene being present in quantity less by a determined proportion than the quantity desired for a copolymerization with the polyester, centrifugally forming an inner annular body of styrene monomer in surface contact with the first body, centrifugally flowing a desired quantity of glass flakes into the styrene body for removing adsorbed air from the flakes and wetting the flakes with the styrene in quantity sufficient to supply the shortage of styrene for copolymerization with the polyester, centrifugally flowing the styrene wetted flakes into the polyester-styrene mixture, removing the uncombined residue of the styrene, and copolymerizing the polyester-styrene mixture containing the flakes to a solid state.

12. A method for preparing a flake reinforced acrylic resin comprising centrifugally forming an annular body of a methyl methacrylate polymer dissolved in a catalyzed acrylic monomer, centrifugally forming an inner annular body of an uncatalyzed liquid acrylic monomer while maintaining centrifugal force on the annular body of the methyl methacrylate polymer, centrifugally flowing a quantity of reinforcing flakes into and through the body of monomer and into the solution of polymer monomer, and removing the uncombined residue of the monomer, and polymerizing the flake-containing acrylic monomer having methyl methacrylate polymer dissolved therein to a solid state.

13. A method for admixing reinforcing flakes and a viscous liquid resin comprising: centrifugally forming an annular body of the resin; centrifugally forming an inner annular body of a second liquid in surface contact with the body of resin, the second liquid having a high boiling point and being appreciably soluble in the resin and compatible therewith; centrifugally flowing a quantity of reinforcing flakes which are compatible with the second liquid into and through the second liquid and into the resin; removing the uncombined residue of the second liquid from adjacency to the resin; and curing the flake-containing resin whereby the second liquid vaporizes therein during curing thereof for forming gas pockets at resin-flake interfaces in the flake-containing resin.

14. A method for preparing a glass flake-reinforced polyester resin comprising: centrifugally forming an annular body of a viscous liquid, copolymerizable mixture of a polyester resin and styrene monomer, the styrene being present in a quantity less by a determined proportion than the quantity desired for a copolymerization with the polyester; centrifugally forming an inner annular body of styrene monomer in surface contact with the first body; centrifugally flowing a desired quantity of glass flakes into the styrene body for removing adsorbed air from the flakes and wetting the flakes with the styrene in quantity sufficient to supply the shortage of styrene for copolymerization with the polyester; centrifugally flowing the styrene wetted flakes from the styrene body and into the polyester-styrene mixture to provide from the quantity of styrene present in the viscous liquid polyester-styrene mixture plus the quantity of styrene wetted onto the flakes and carried into the mixture with the flakes a sum total of styrene in the mixture which is in excess of the quantity of styrene desired for copolymerization with the polyester; removing the uncombined residue of styrene; and applying heat to the mixture containing the glass flake to polymerize the mixture and to vaporize the excess of styrene to form gas pockets at resin-flake interfaces in the flake-containing resin.

References Cited in the file of this patent

UNITED STATES PATENTS

| | | |
|---|---|---|
| 2,207,822 | Rooney et al. | July 16, 1940 |
| 2,614,058 | Francis | Oct. 14, 1952 |
| 2,695,856 | Firth | Nov. 30, 1954 |
| 2,803,043 | Stephens | Aug. 20, 1957 |
| 2,857,626 | Wagner et al. | Oct. 28, 1958 |
| 2,877,501 | Bradt | Mar. 17, 1959 |
| 2,887,728 | Usab | May 26, 1959 |
| 2,903,389 | Fujita | Sept. 8, 1959 |

FOREIGN PATENTS

| | | |
|---|---|---|
| 742,413 | Great Britain | Dec. 30, 1955 |